United States Patent
Besel et al.

(10) Patent No.: US 10,256,520 B2
(45) Date of Patent: Apr. 9, 2019

(54) SIDE LAUNCH CONTACTLESS SIGNAL CONDUIT STRUCTURES

(71) Applicant: Keyssa Systems, Inc., Campbell, CA (US)

(72) Inventors: Alan Besel, Ridgefield, WA (US); Eric Sweetman, Portland, OR (US); Bojana Zivanovic, Portland, OR (US)

(73) Assignee: KEYSSA SYSTEMS, INC., Campbell, CA (US)

(*) Notice: Subject to any disclaimer, the term of this patent is extended or adjusted under 35 U.S.C. 154(b) by 40 days.

(21) Appl. No.: 15/411,748

(22) Filed: Jan. 20, 2017

(65) Prior Publication Data

US 2018/0212297 A1 Jul. 26, 2018

(51) Int. Cl.
*H01P 3/12* (2006.01)
*H01P 3/16* (2006.01)
*H02J 7/00* (2006.01)
*H04B 5/00* (2006.01)
*H01P 5/107* (2006.01)
*H01Q 13/02* (2006.01)
*H01Q 13/06* (2006.01)

(52) U.S. Cl.
CPC ............. *H01P 3/12* (2013.01); *H01P 3/16* (2013.01); *H01P 5/107* (2013.01); *H01Q 13/02* (2013.01); *H01Q 13/06* (2013.01); *H02J 7/00* (2013.01); *H04B 5/00* (2013.01)

(58) Field of Classification Search
CPC .............. H01P 3/16; H01P 5/18; H01P 5/188
USPC ....................................................... 333/137
See application file for complete search history.

(56) References Cited

U.S. PATENT DOCUMENTS

2017/0324446 A1* 11/2017 Cook .................. H01P 3/16

* cited by examiner

*Primary Examiner* — Robert J Pascal
*Assistant Examiner* — Kimberly E Glenn
(74) *Attorney, Agent, or Firm* — Van Court & Aldridge LLP

(57) ABSTRACT

Conduit structures for redirecting extremely high frequency (EHF) signals are disclosed herein. The conduit structures discussed herein are designed to re-direct EHF or RF signal energy from a first signal path to a second signal path. The conduit structures according to embodiments discussed herein can re-direct the RF signal energy while simultaneously adhering to specified signaling characteristic of the RF signal and minimizing stray RF signal radiation within a device to support device-to-device contactless communications.

19 Claims, 18 Drawing Sheets

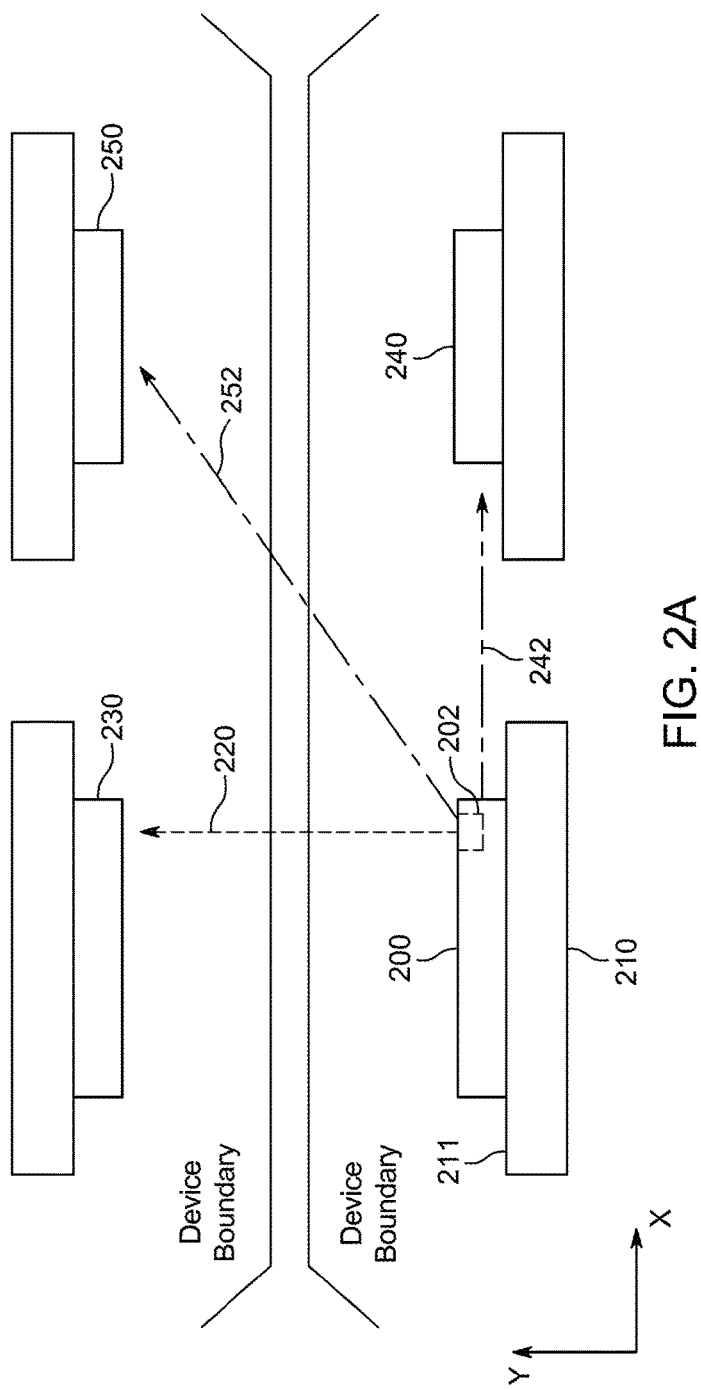
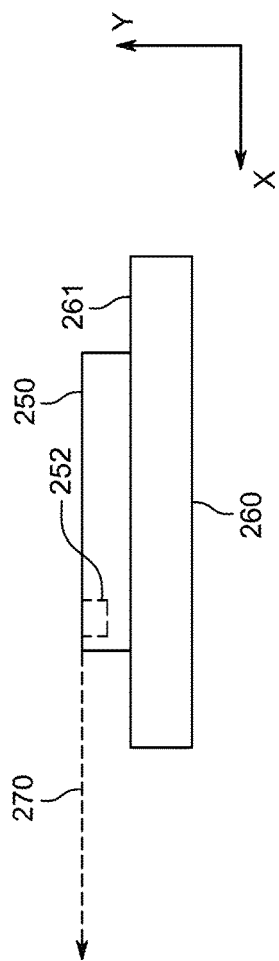
FIG. 2A
FIG. 2B

SIDE LAUNCH CONTACTLESS SIGNAL CONDUIT STRUCTURES

FIELD OF THE INVENTION

The present disclosure relates to contactless connector assemblies and more specifically to contactless signal conduits that define signaling pathways for extremely high frequency signals.

BACKGROUND

Advances in semiconductor manufacturing and circuit design technologies have enabled the development and production of integrated circuits (ICs) with increasingly higher operational frequencies in the non-wired realm. As a result, electronic products and systems incorporating such integrated circuits are able to provide much greater functionality than previous generations of products. This additional functionality has generally included the processing of increasingly larger amounts of data at increasingly higher speeds. The higher operation speeds can result in enhanced radio frequency signal propagation that has a tendency to disperse in undesired ways that can cause signal loss and crosstalk.

BRIEF SUMMARY

Conduit structures for redirecting extremely high frequency (EHF) signals are disclosed herein. The conduit structures discussed herein are designed to re-direct EHF or RF signal energy from a first signal path to a second signal path. The conduit structures according to embodiments discussed herein can re-direct the RF signal energy while simultaneously adhering to specified signaling characteristic of the RF signal and minimizing stray RF signal radiation within a device to support device-to-device contactless communications.

An air-filled dielectric conduit structure for use with a contactless communications unit (CCU) mounted to a substrate, wherein the CCU is operative to selectively transmit and receive RF signals along a first path, is provide. The conduit structure can include a dielectric structure comprising an RF interface region, an external tapered region, an internal tapered region, and an air-filled cavity, wherein the CCU is capped by the air-filled cavity, and wherein a combination of the air-filled cavity and internal and external tapered regions redirects RF signals transmitted by the CCU along the first path to the RF interface region via a second path and redirects RF signals received via the RF interface region along the second path to the CCU via the first path.

A dielectric insert dielectric conduit structure for use with a contactless communications unit (CCU) mounted to a substrate, wherein the CCU is operative to selectively transmit and receive RF signals along a first path, is provided. The conduit structure can include a metallized cover constructed to be mounted to the substrate and to cover the CCU, the metallized cover comprising an opening through which the RF signals travel along a second path; and a dielectric insert constructed to be secured within the metallized cover and to be positioned adjacent to the CCU, the dielectric insert comprising an RF interface positioned adjacent to the opening, wherein a combination of the metallized cover and the dielectric insert redirects RF signals transmitted by the CCU along the first path to the RF interface region via the second path and redirect RF signal received via the RF interface region along the second path to the CCU via the first path.

A system is provided that includes a substrate, a plurality of contactless communications units (CCUs) mounted to the substrate, wherein the CCUs are operative to selectively transmit and receive RF signals along respective first paths, and a plurality of RF signal redirection structures, each structure mounted over one of the plurality of CCUs and secured to the substrate, wherein each RF signal redirection structure is operative to redirect RF signals from the first path to a second path or redirect RF signals from the second path to the first path for each CCU.

BRIEF DESCRIPTION OF THE DRAWINGS

Figure 1:
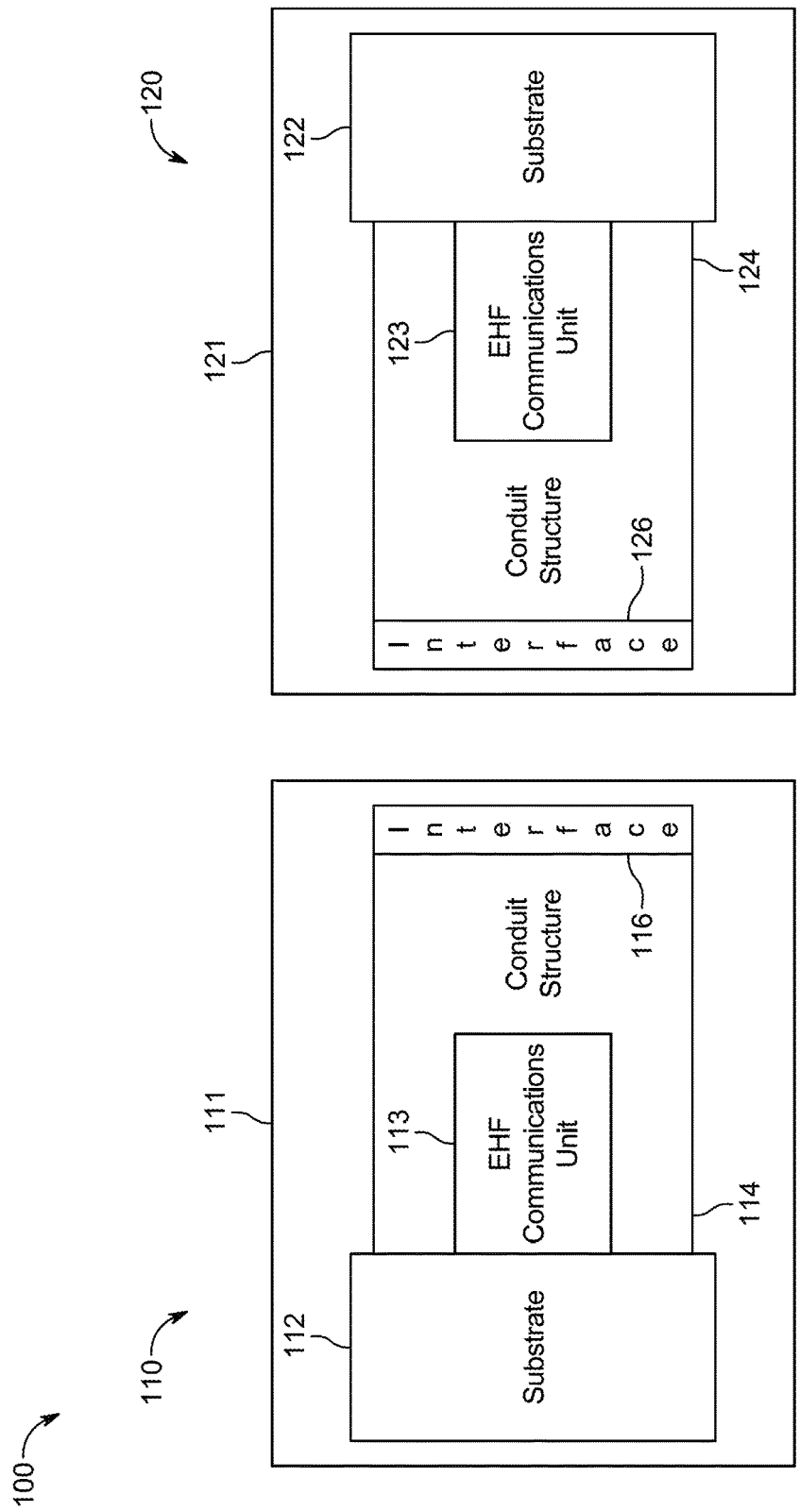
Figure 4A:
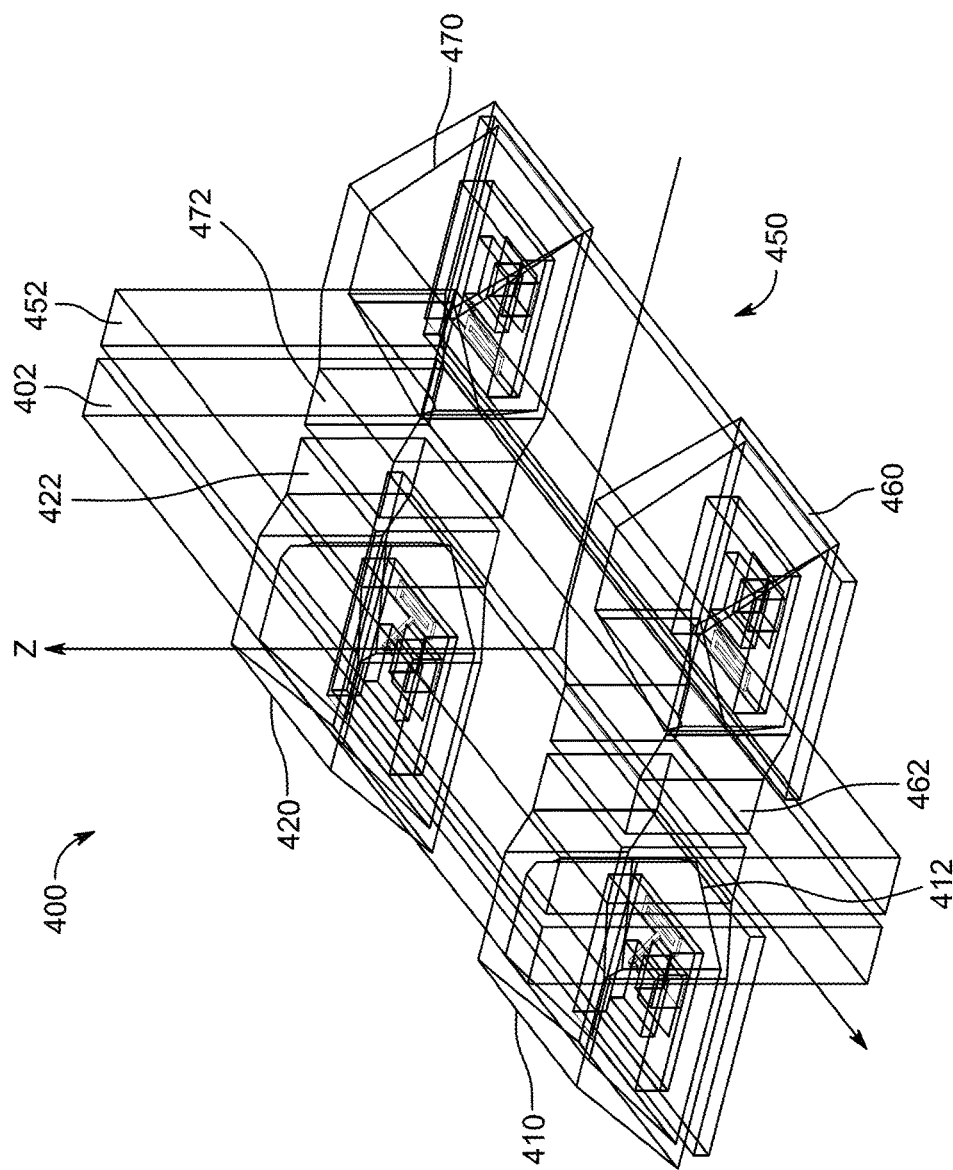
Figure 4B:
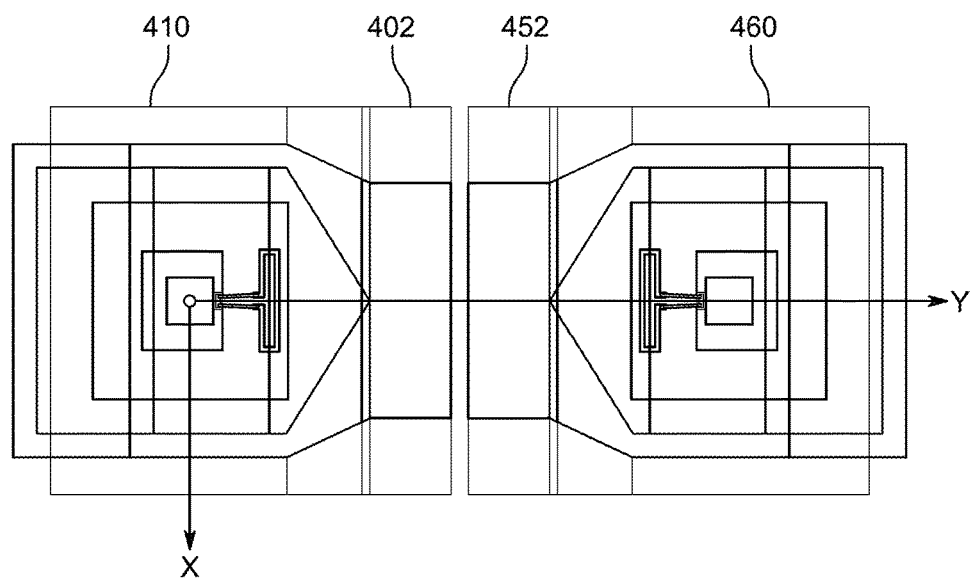
Figure 4C:
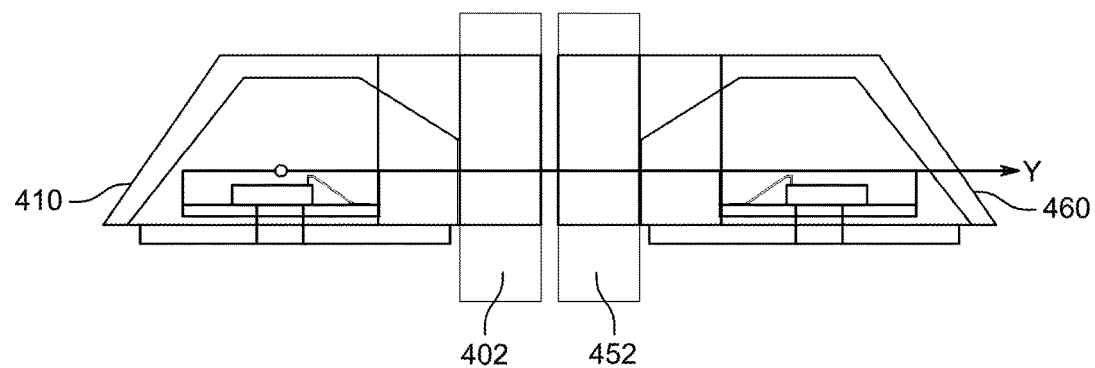
Figure 5A:
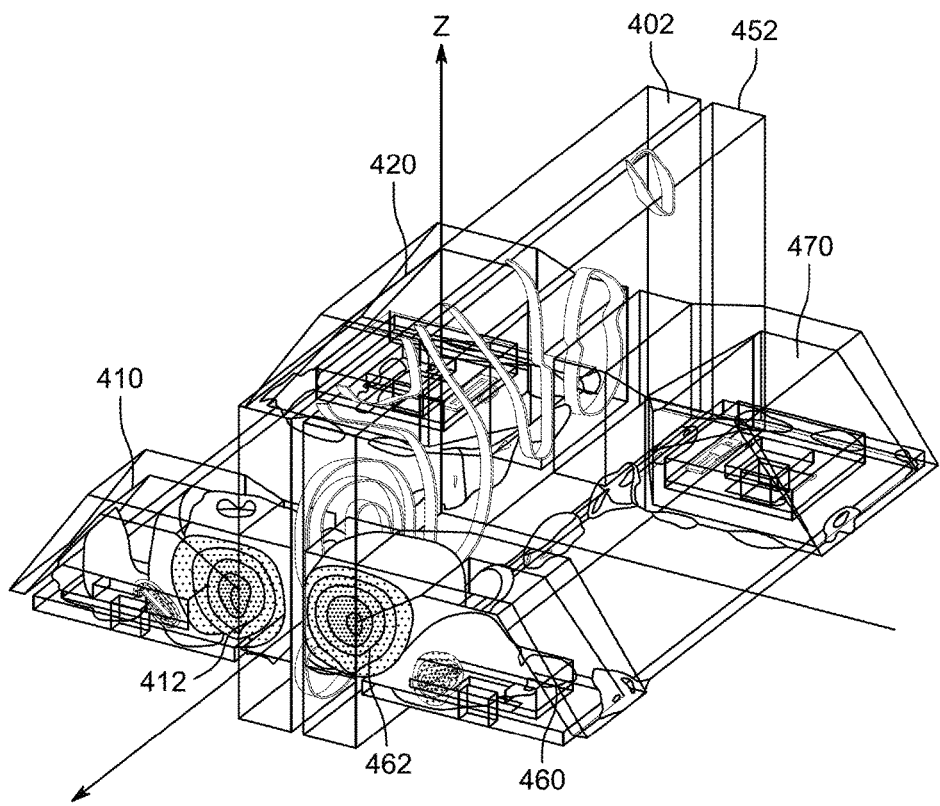
Figure 5B:
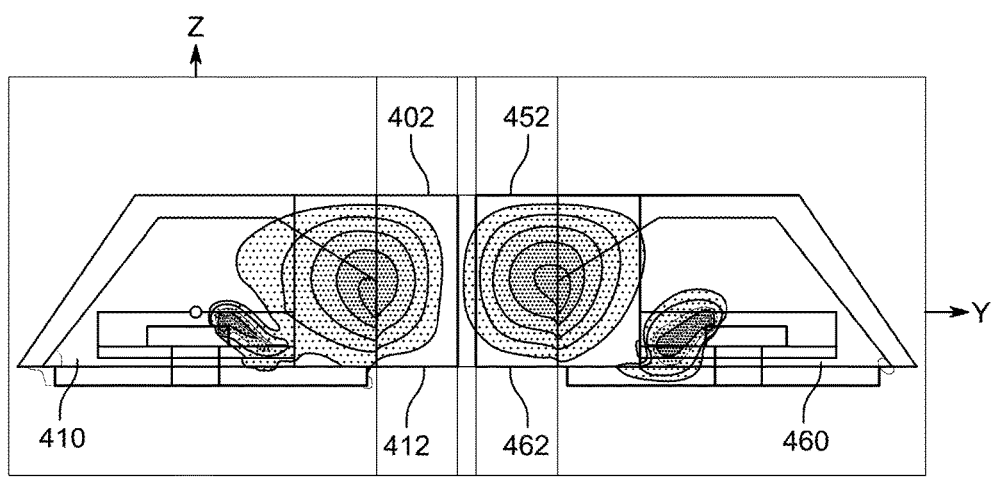
Figure 6:
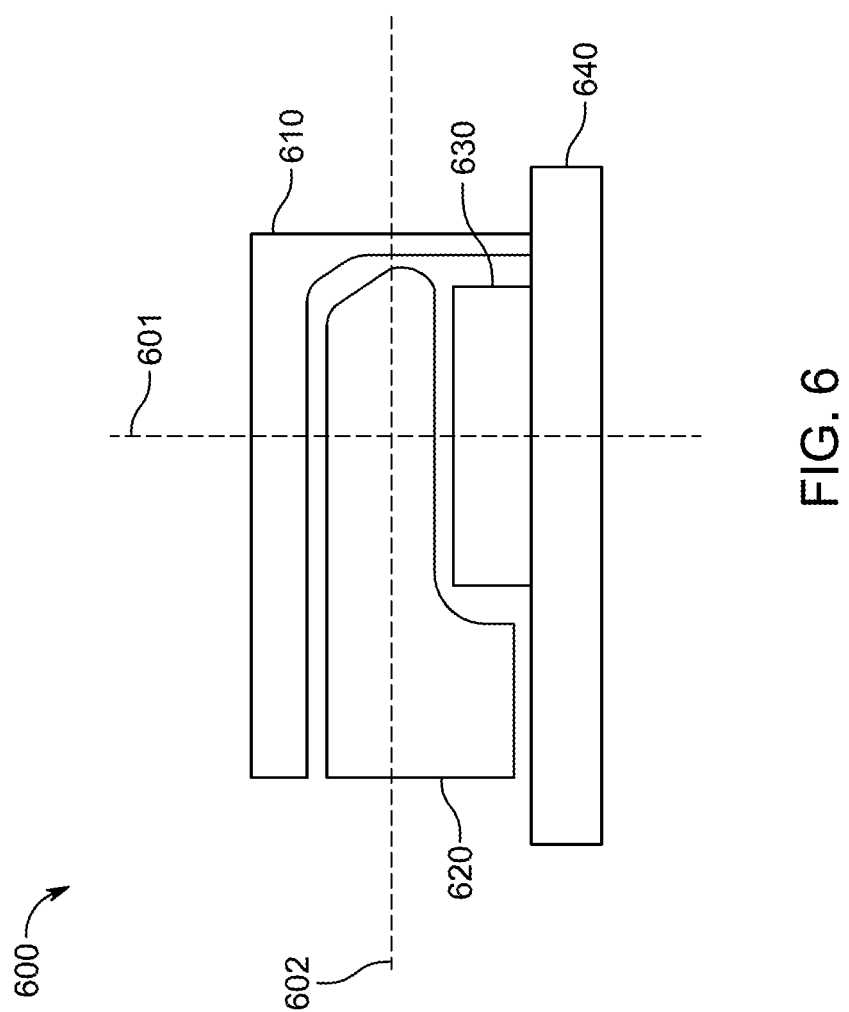
Figure 8:
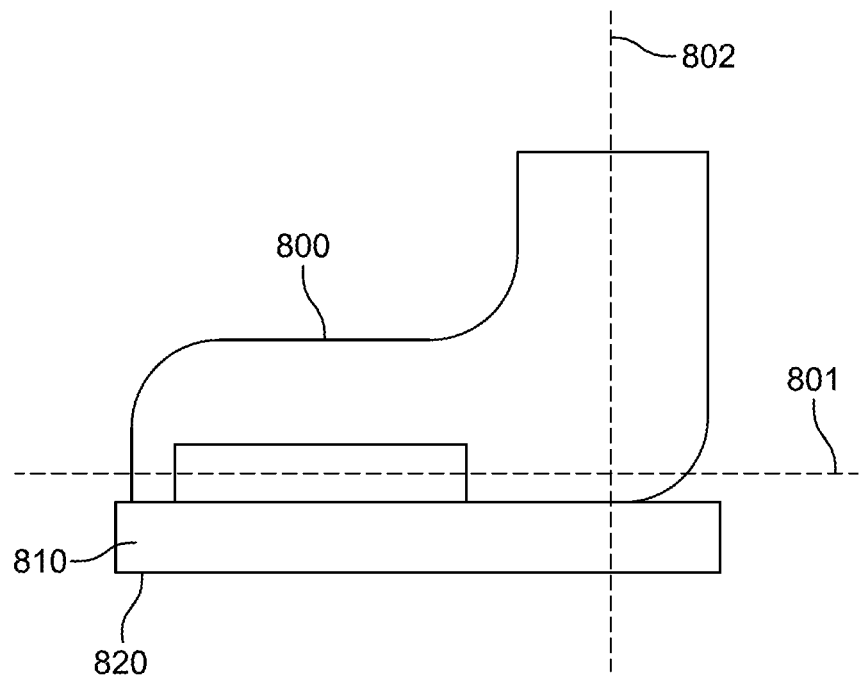
Figure 9:
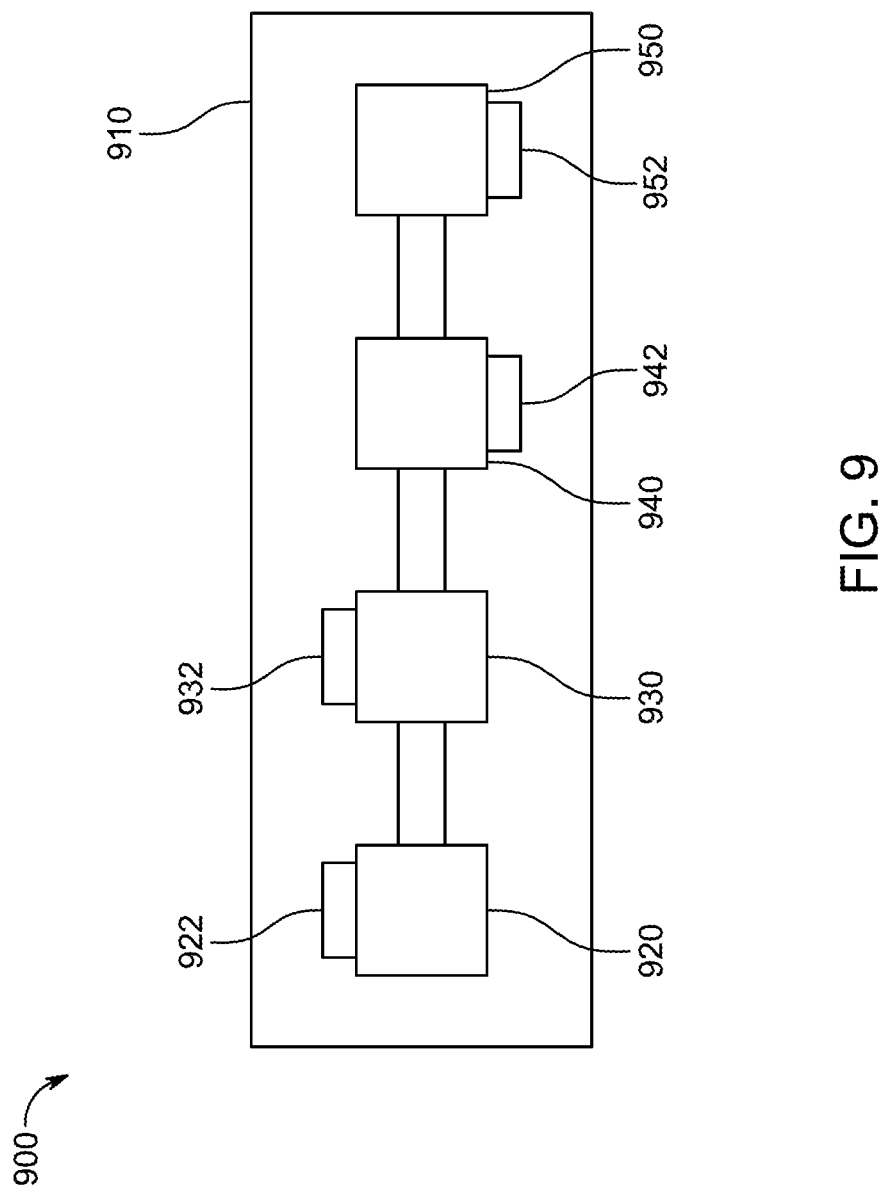

Having thus described communication between devices in general terms, reference is now made to the accompanying drawings, which are not necessarily drawn to scale, and wherein:

FIG. 1 illustrates an embodiment of a communication system;

FIG. 2A shows a grossly simplified and illustrative communication unit mounted to substrate, according to an embodiment;

FIG. 2B shows another grossly simplified and illustrative communication unit mounted to substrate, according to an embodiment;

FIGS. 3A-3I show several different views of an air-filled dielectric conduit structure, according to an embodiment;

FIGS. 4A-4C show illustrative perspective, top, and side views, respectively of multiple air-filled dielectric conduit structures, according to various embodiments;

FIGS. 5A and 5B show illustrative RF signal propagation of FIGS. 4A and 4C, respectively, according to various embodiments;

FIG. 6 shows an illustrative cross-sectional view of dielectric insert conduit structure, according to an embodiment;

FIGS. 7A-7K show several different views of dielectric insert conduit structure, according to an embodiment;

FIG. 8 shows an illustrative side view of a signal redirecting conduit structure, according to an embodiment; and FIG. 9 shows an illustrative top view of a docking system using signal redirecting conduit structures according to an embodiment.

DETAILED DESCRIPTION

Illustrative embodiments are now described more fully hereinafter with reference to the accompanying drawings, in which representative examples are shown. The disclosed communication system and method may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In today's society and ubiquitous computing environment, high-bandwidth modular and portable electronic devices are being used increasingly. Security and stability of communication between and within these devices is important to their operation. In order to provide improved secure high-bandwidth communications, the unique capabilities of contactless communication between electronic devices and between sub-circuits within each device may be utilized in innovative and useful arrangements.

Such communication may occur between radio frequency communication units, and communication at very close distances may be achieved using EHF frequencies (typically, 30-300 GHz) in an EHF communication unit. An example of an EHF communications unit is an EHF comm-link chip. Throughout this disclosure, the terms comm-link chip, and comm-link chip package are used to refer to EHF antennas embedded in IC chips or packages.

The acronym "EHF" stands for Extremely High Frequency, and refers to a portion of the electromagnetic (EM) spectrum in the range of 30 GHz to 300 GHz (gigahertz). The term "transceiver" may refer to a device such as an IC (integrated circuit) including a transmitter (Tx) and a receiver (Rx) so that the integrated circuit may be used to both transmit and receive information, such as data. Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to electromagnetic (EM) rather than electrical (wired, contact-based) connections and transport of signals between entities (such as devices). As used herein, the term "contactless" may refer to a carrier-assisted, dielectric coupling system. The connection may be validated by proximity of one device to a second device. Multiple contactless transmitters and receivers may occupy a small space. A contactless link established with electromagnetics (EM) may be channelized in contrast with a wireless link which typically broadcasts to several points.

FIG. 1 illustrates a communication system 100. As shown, system 100 may include a first device 110 configured to communicate with a second device 120. First device 110 may be configured to communicate with and/or connect to second device 120 and vice versa. Further, first device 110 and second device 120 can be any apparatus capable of connecting and communicating with each other. First device 110 may couple directly to device 120 via a direct coupling or via a physical coupling member (e.g., cable) that can couple the two devices together. For example, device 110 can be a device such as a mobile device or a computer, and device 120 can be a cable device such as a dongle designed to interface with the device 110. First device 110 may include housing 111 that encompasses substrate 112, one or more EHF contactless communication units (CCUs) 113, conduit structure 114, and interface 116. Similarly, second device 120 may include housing 121 that encompasses substrate 122, one or more EHF contactless communication units (CCUs) 123, conduit structure 124, and interface 126.

Housings 111 and 121 may represent the structure that forms the outer dimensions of devices 110 and 120. Housings 111 and 121 may be constructed from any suitable material or materials. In some embodiments, interface 116 may be integrated within housing 111. For example, interface 116 may be a separate component that is coupled to housing 111. As another example, a portion of housing 111 can be designated as the interface. That is, the housing itself serves as the interface without the need for a separate component. Interface 116 may provide indicia and/or device coupling mechanisms (e.g., keying structure, magnets, etc.) for specifying the location of the interface and for connecting to the interface of another device.

Substrates 112 and 122 may be any suitable structure on which CCUs 113 and 123 can reside. For example, substrates may be a circuit board, a printed circuit board, or a flexible printed circuit board. CCUs 113 and 123 may be positioned on their respective substrates 112 and 122 in a manner that minimizes a distance between the substrate and respective interfaces 116 and 126. Such placement may assist in managing signal propagation from the CCUs to the interface.

EHF CCUs 113 and 123 can be EHF transceivers capable of selectively transmitting and receiving EHF signals. When operating as a transmitter, the EHF CCUs may transmit an electromagnetic EHF signal, and when operating as a receiver, the EHF CCUs may receive an electromagnetic EHF signal. For example, in one embodiment, device 110 can include two EHF CCUs and device 120 can include two EHF CCUs. In device 110, a first EHF CCU may operate as a transmitter and a second EHF CCU may operate as a receiver. Similarly, device 120 may include first and second EHF CCUs that operate as transmitter and receiver, respectively. The transmitter EHF CCU of device 110 may transmit EHF signals to the receiver EHF CCU of device 120, and the transmitter EHF CCU of device 120 may transmit EHF signals to the receiver EHF CCU of device 110.

Conduit structures 114 and 124 may manage the propagation of EHF signals through one or more channels that exist between EHF CCUs and the interface by containing the EHF signal energy within the confines of each channel. All channels referred to herein may be EHF containment channels that guide and contain EHF signal energy. The dimensions of a radiation field associated with a first EHF CCU can potentially overlap the radiation field of one or more other EHF CCUs. Such overlap can cause cross-talk or interference with EHF signaling. Conduit structure 114 may provide one or more EHF containment channels or pathways that exist between EHF CCUs 13 and interface 116 to prevent the radiation fields of multiple EHF CCUs from overlapping each other. Similarly, conduit structure 124 may provide one or more EHF containment channels or pathways that exist between EHF CCUs 123 and interface 126. An EHF containment channel may exist for each EHF communication unit, and each channel is effectively isolated from each other to prevent cross-talk and signal degradation. Thus, the conduit structure can simultaneously direct EHF signals along desired pathways and prevent the EHF signals from traversing or entering undesired regions. Each channel of structures 114 and 124 can direct or focus EHF signal energy into a cross sectional area smaller than the transverse dimensions of the EHF CCU's radiation field. As a result, the EHF signals can be focused to travel along a desired signal path and away from undesirable paths.

The conduit structure can be secured within each device in a variety of ways. In one approach, conduit structure 114 may interface with substrate 112 and interface 116. In this approach, structure 114 may surround EHF CCU 113. If multiple CCUs 113 exist, structure 114 may include multiple channels that each independently surround a respective one of the CCUs. In another approach, conduit structure 114 can be mounted to interface 116 and be suspended over EHF CCU 113. In yet another approach, conduit structure 114 can be mounted to substrate 112 and extend in the direction of interface 116.

The conduit structures can be constructed from a combination of different materials to shape the direction of signal propagation and to mitigate EHF leakage (which may cause cross-talk). These materials can include EHF transmissive materials that are operable to facilitate propagation of EHF signals, EHF reflective materials that are operable to reflect EHF signals, and EHF absorptive materials that are operable to absorb EHF signals. Examples of transmissive materials can include plastics and other materials that are electrically non-conductive (i.e., dielectric). Reflective materials can include, for example, metals, metal alloys, metal foam, and other materials that are electrically conductive. Examples of absorptive materials can include, for example, magnetically loaded, rubber materials that are electrically non-conductive, but exhibit effective EHF dampening resonance due to their high permittivity and permeability.

In some embodiments, the conduit structures can be constructed from just one of the different material types. For example, the conduit structure can be constructed from just the EHF transmissive material or just the EHF reflective material. In other embodiments, the structure can be constructed from two or more of the different material types. For example, one portion can be constructed from transmissive materials, and another portion can be constructed from reflective materials.

Conduit structures 114 and 124 may be constructed to exhibit any suitable shape, and can be constructed from a single component or multiple components. Regardless of shape and construction configuration, each conduit may include at least one signal collimating structure that has a channel existing within the collimating structure. Any suitable shape, including for example, rectangular, elliptical, or polygonal shapes of any suitable dimension may characterize each channel. The collimating structure may be constructed from, lined with, or coated with an EHF reflective material that may simultaneously guide EHF signals along the channel and prevent those same signals from penetrating the channel wall.

In addition to providing one or more pathways for channeling EHF signals, the conduit structures may protect the EHF CCUs from shock events. That is, during an event that imparts shock energy to the device, such as a device drop, the conduit structure can absorb the shock to prevent potentially damaging energy transfer to the EHF CCUs. In one embodiment, the shock protection can be achieved by constructing at least a portion of the conduit structure from a relatively rigid material (e.g., plastic) that covers the EHF CCU(s). In another embodiment, shock protection can be achieved using a relatively compliant material (e.g., foam) that also covers the EHF CCU(s). In yet another embodiment, a combination of relatively rigid and compliant materials may be used to provide protection.

The conduit structure may also be constructed to account for tolerance variations in device stackup. That is, variations in component construction can vary the stackup tolerances when assembled. For example, the distance between the EHF units and the interface may vary depending on construction and variations in components. In one build, the distance may be x and in another build, the distance may be y, where y is greater than x. The conduit structure may include a compliant material that is designed to accommodate variations in stackup. The compliant material may be compressible and thus able to ensure that the conduit structure makes a secure and flush connection with the interface.

Devices 110 and 121 may include each include anti-spurious radiation (ASR) regions that may minimize transmission of spurious EHF signals that can exist at or near a break in a channel containing the EHF signals. A break may occur at locations where the conduit structure interfaces with another structure or component. For example, a potential break may exist at the junction formed between interface 116 and structure 114. Another potential break may exist at the junction formed between substrate 112 and structure 114. Yet another potential break may exist on the surface of interface 116 that is mounted to housing 111 or the portion of housing 111 designated as the interface. ASR regions can be incorporated into the conduit structures or mounted thereto to combat spurious EHF signals. The ASR regions can include various anti-spurious radiation materials and/or grooves. ASR materials can include any combination of EHF transparent, EHF reflective, and EHF absorptive materials. Grooves can include grooves or channels that exist in strategic locations within or adjacent to the conduit structures.

FIG. 2A shows a grossly simplified and illustrative EHF CCU 200 mounted to substrate 210, according to an embodiment. CCU 200 may include transducer 202 that is designed to transmit contactless EHF signals in the direction of signal path 220. Path 220 projects in a direction perpendicular to surface 211 of substrate 210. In other words, path 220 projects in the Y-axis direction towards CCU 230. The direction of signal path 220 is merely illustrative. For example, the signal path can be directed in any suitable direction. For example, FIG. 2B shows a grossly simplified and illustrative EHF CCU 250 mounted to substrate 260. CCU 250 may include transducer 252 that is designed to transmit contactless EHF signals in the direction of signal path 270. Path 270 projects in a direction co-planar to surface 261 of substrate 260. In other words, path 270 projects in the X-axis direction.

Thus, although it may be desirable for EHF signals to be transmitted along a desired signal path (e.g., such a path 220), non-directed, free flowing EHF signal energy may emit in all directions, thereby resulting in radiation patterns that are not confined to the desired signal path. Non-directed transmission of EHF signals in undesired directions may cause cross-talk and multi-path cross-talk. Cross-talk may occur among adjacent CCUs in the same device. Such cross-talk may exist over-the-air and/or within circuit boards. This is illustrated in FIG. 2A, which shows cross-talk EHF signal path 242 emanating from CCU 200 to CCU 240. Multi-path cross-talk may occur when a CCU a first device communicates with an unintended CCU of a second device. This is illustrated FIG. 2A, which shows multi-path cross-talk signal path 252 emanating from CCU 200 to CCU 250. The non-directed transmission of EHF signals may also result in reduced signal strength, thereby potentially making it more difficult for receiving CCUs to capture the EHF signals. Various embodiments discussed herein are used to direct EHF signals along desired signal pathways (e.g., pathway 220) and eliminate undesired pathways (e.g., pathways 242 and 252). Spurious radiation may also contribute to cross-talk and/or signal loss and can occur when a break exists in a channel containing the EHF signals. The breaks may occur at locations where two devices are mated together, for example. Embodiments described below in connection with FIGS. 3-9 provide different solutions to mitigate cross talk and multi-path cross talk, among other things.

The conduit structures discussed herein are designed to re-direct the RF signal energy from a first signal path to a second signal path. For example, a CCU residing on a substrate such as a circuit board may be designed to transmit and receive RF signal energy along a path that is perpendicular to a top surface of the substrate. In other words, assuming no path altering structures are present, the RF signal may travel along a path that is vertical. However, the vertical path may not be the desired path for the RF signal. Depending on the application, the desired path may range anywhere between 1 and 179 degrees, 10 and 170 degrees, or 85 and 95 degrees with respect to the vertical path. For example, in one embodiment the desired path may be 90 degrees with respect to the vertical path, may exist at an acute angle with respect to the vertical path, or may exist at an obtuse angle with respect to the vertical path. In other words, the desired signal path can be a horizontal path despite the fact the CCU is designed for vertical path RF communications. The conduit structures according to embodiments discussed herein can re-direct the RF signal energy while simultaneously adhering to specified signaling characteristic of the RF signal and minimizing stray RF signal radiation within a device to support device-to-device contactless communications.

Figure 3A:
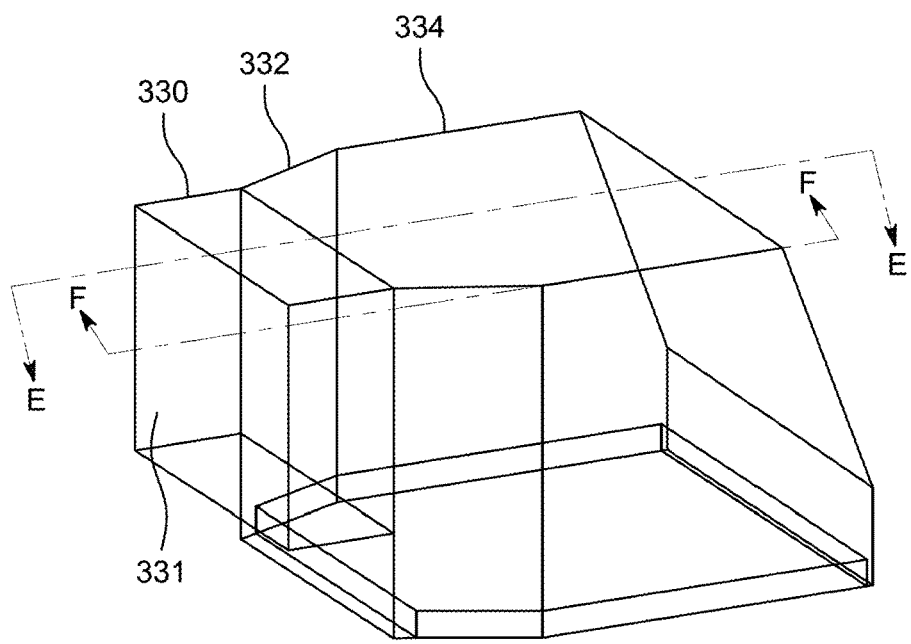
Figure 3B:
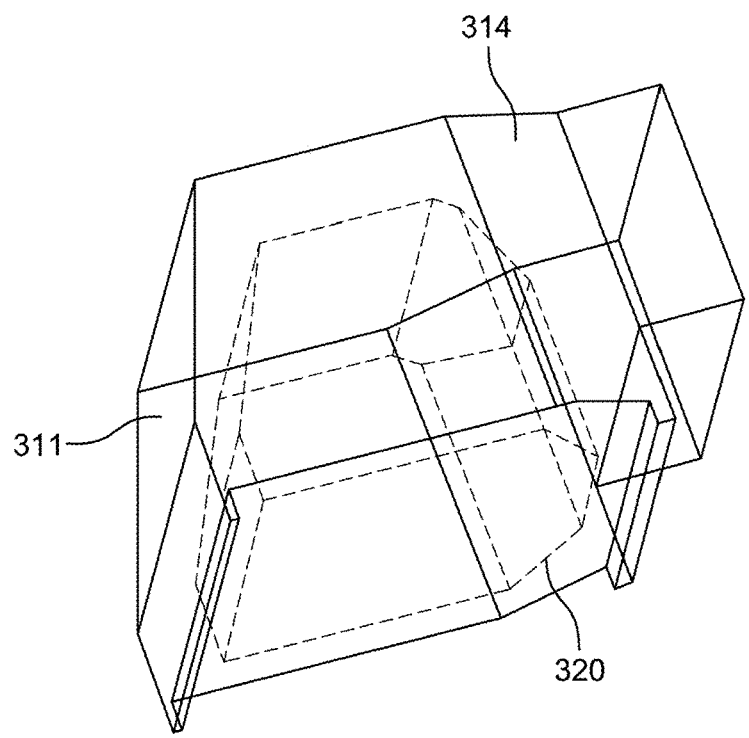
Figure 3C:
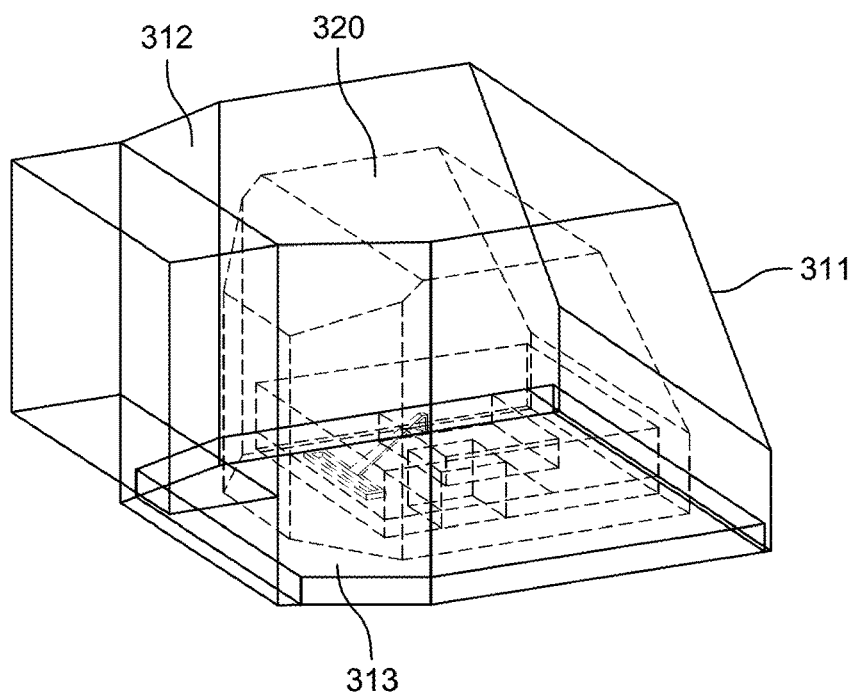
Figure 3D:
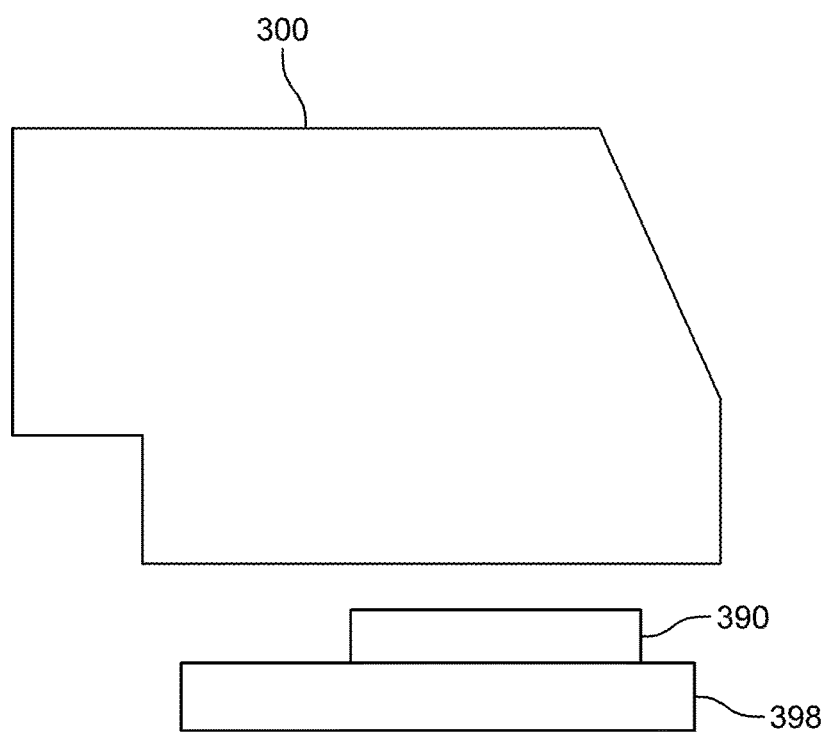
Figure 3E:
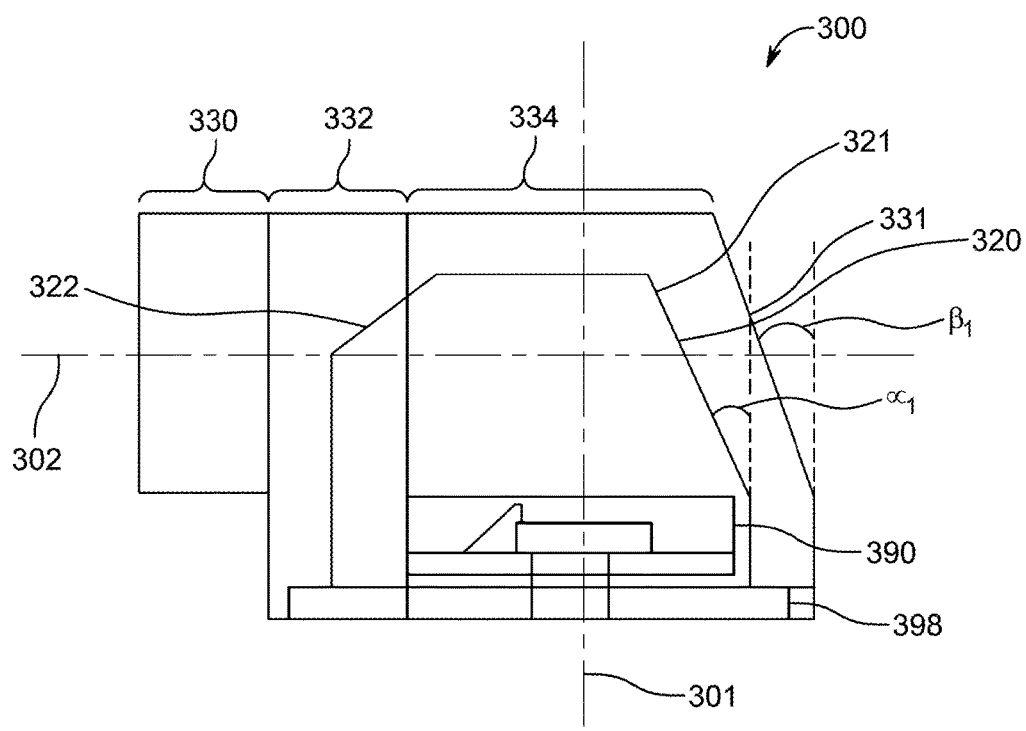
Figure 3F:
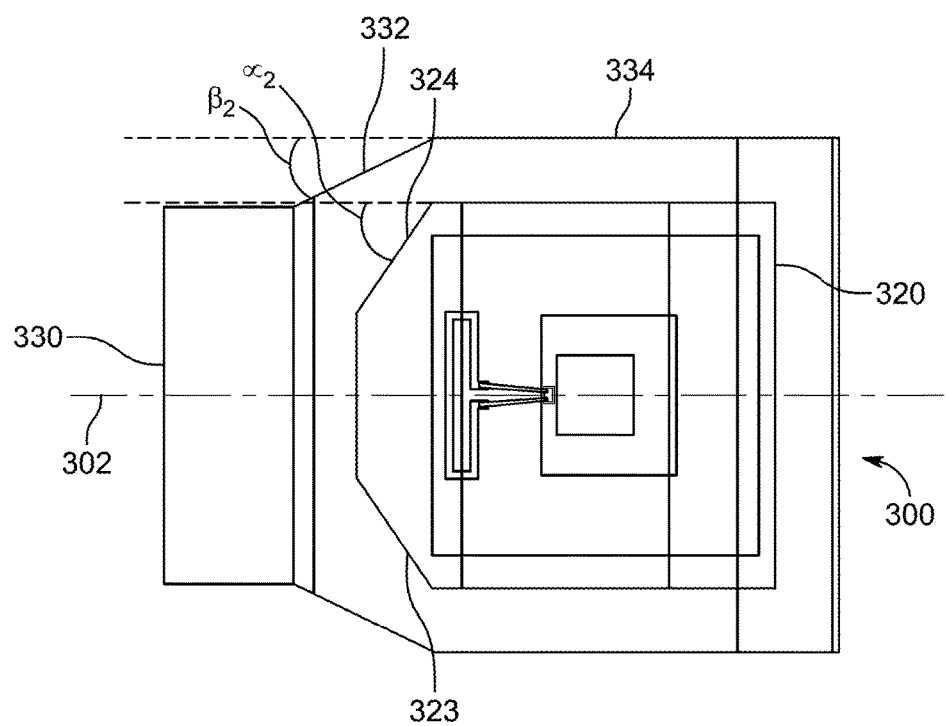
Figure 3G:
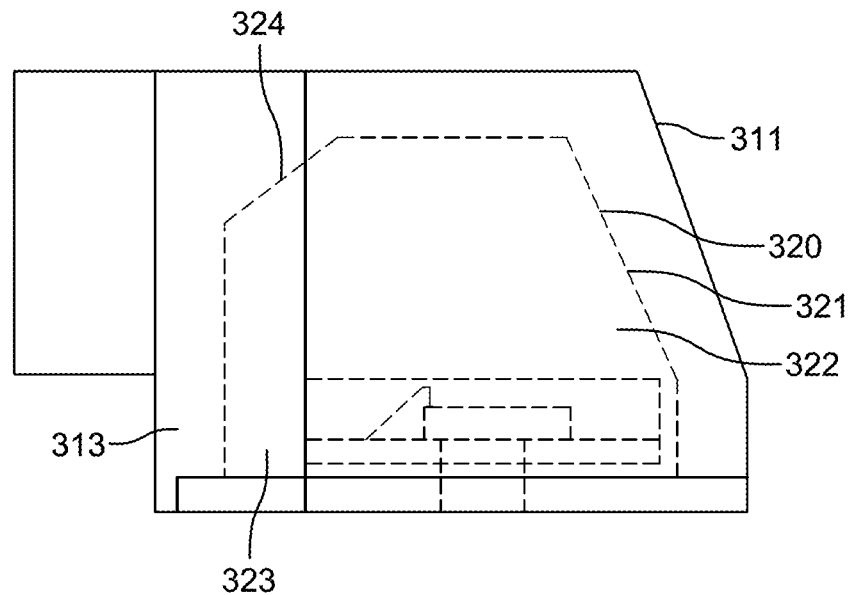
Figure 3H:
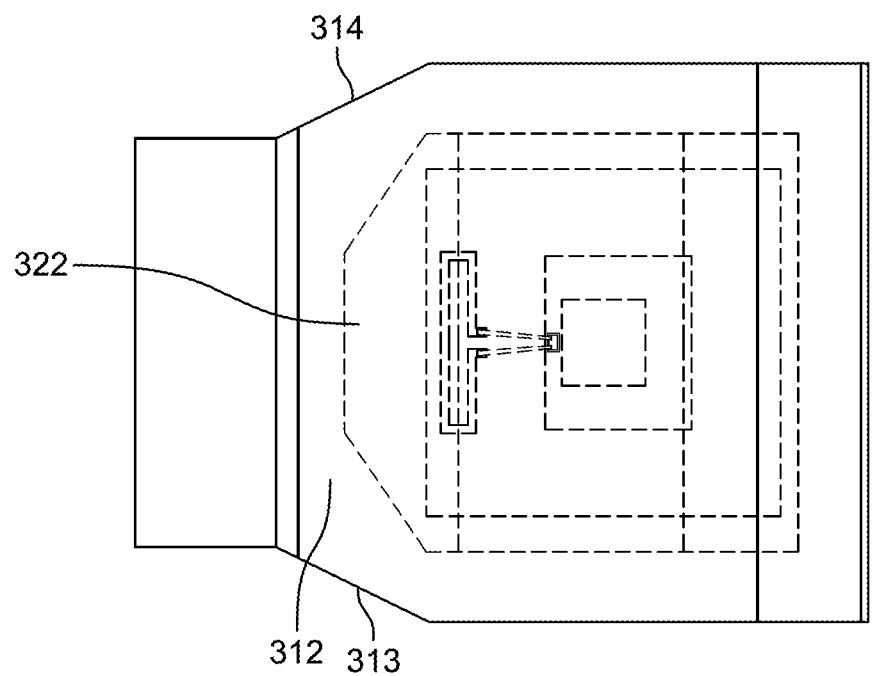
Figure 3I:
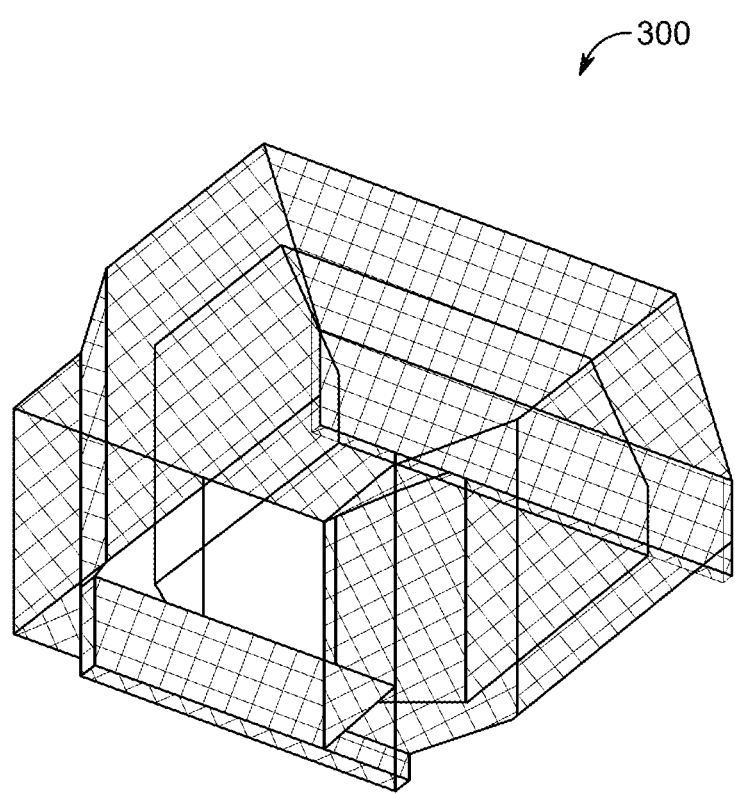

FIGS. 3A-3I show several different views of an air or dielectric-filled conduit structure (CS) 300 according to an embodiment. The dielectric materials may be plastics, including ABS or LDPE. FIGS. 3A-3C show perspective views of CS 300, with FIGS. 3B-3B showing hidden lines. FIG. 3D shows an illustrative exploded view of CS 300, CCU 390, and substrate 398. FIG. 3E shows an illustrative cross-sectional view taken along line E-E of FIG. 3A. FIG. 3F shows an illustrative cross-sectional view taken along line F-F of FIG. 3A. FIG. 3G shows an illustrative side view with hidden lines, and FIG. 3H shows an illustrative top view with hidden lines. FIG. 3I shows illustrative perspective view of CS 300 with metal coating 370 applied to selective portions of the outer surface of CS 300. FIGS. 3A-3I will be collectively referred to herein.

CS 300 is designed to be placed over CCU 390 and substrate 398 such that CCU 390 exists in an air pocket existing within CS 300. CCU 390 may be designed to transmit and receive RF signals along first path 301, which runs perpendicular with respect to CCU 390 and a top surface of substrate 398. The desired RF signal path is shown as second signal path 302, which runs perpendicular to path 301 and enters/exits RF interface region 330. CS 300 may be designed to fit like a cap over CCU 390, and in some embodiments, may interlock with substrate 398 for secure fit. The air pocket may be defined by internal dimensions of cavity 320 within CS 300. CS 300 may be a molded plastic part constructed to have a particular dielectric constant. The mold is defined by external dimensions that define outer dimensions of CS 300 and is also defined by internal dimensions of cavity 320. Both external and internal dimensions of CS 300 may be selected to re-direct RF signal energy transmitted along path 301 by CCU 390 to path 302 so that it passes out of RF interface region 330 and to re-direct RF signals received via RF interface region 330 along path 302 to path 301 so that it can be received by CCU 390. RF interface region 330 may represent the entry/exit region of RF signals passing into or out of CS 300. RF interface region 330 has a cross-sectional area and may serve as the portion of CS 300 that interfaces with a housing of a device. See, FIGS. 4A-C, which show RF interfacing regions positioned within a housing.

The particular shape of both external and internal dimensions can be selected based on a variety of factors, including but not limited to, the re-direction angle, dielectric constant of the plastic mold, the size of RF interface region 330, desired RF signal propagation, and metallization of the plastic. The dielectric constant of the plastic mold may be uniform throughout, or the dielectric constant can vary. For example, in one embodiment, the dielectric constant may be the same in regions 330, 332, and 334. As another example, in another embodiment, the dielectric constant of region 330 may be different than the dielectric constant of regions 332 and 334. The air or dielectric material contained within cavity 320 has a dielectric constant. The dielectric constant of regions 330, 332, and 334 may be selected based on the assumption that the CCU 390 is directly interfacing with the air contained in cavity 332. If, for example, cavity 332 is filled with matter other than air (e.g., such as an insert shown in FIG. 6), the dielectric of regions 330, 332, 334 may be selected based on the dielectric of the matter contained in cavity 320, and/or the cross-sectional area of region 330 may be selected based on the dielectric of the matter contained in cavity 320. Selection of the dielectric can be made based on several different factors: 1) RF requirements of the design— the cavity is designed for a specific dielectric constant material to give the greatest signal strength and reduce multi-modes and 2) within the range of dielectric allowed by the design, the material may be chosen based on cost of material, ease of material processing, and/or material processing availability.

The minimum dimension of cavity 320 is such that it is slightly larger than the footprint of CCU 390. This way, CS 300 can fit over CCU 390. The wall thickness of CS 300 may be at least 0.75 millimeters.

RF signal propagation refers to the speed of the RF signal traveling through CS 300. The internal and outer dimensions of CS 300 can affect RF signal propagation. In addition, transitions in dielectric constants (e.g., from cavity 320 to region 330) can also affect signal propagation. Further still, the metallization of the plastic may affect RF signal propagation. In some embodiments, CS 300 may include a metal layer that prevents RF signal penetration through selective regions of CS 300. See, for example, FIG. 3I, which shows cross-hatch lines indicating presence of metallization. For example, the metal layer may exist on selected or all surfaces of CS 300. The metal layer may be deposited in any number of different ways, including, for example, electroplating, submersion in an electrolytic bath, or sputtering of metal on the plastic in a vacuum or a via plasma deposition. In other embodiments, metal plates may be placed on the outside surfaces. The skin depth of the metal layer is sufficient to prevent electromagnetic penetration. The skin depth may depend on the porosity/smoothness of the plastic and the metal material choice. Some examples of suitable metals can be aluminum, copper, or a copper-nickel. The metal thickness may, for example, range from 1 micron to 10 microns. In copper-nickel embodiments, the nickel may be coated with an anti-oxidation layer to prevent the metal from oxidizing and the skin depth of the nickel may be greater than the skin depth of the copper. There may be no metallization of the inner dimensions. In some embodiments, the metallization only exists on the external dimensions.

The outer dimensions of CS 300 can include several tapered surfaces such as tapered surfaces 311-314 and the inner dimensions of CS 300 may also include several tapered surfaces such as tapered surfaces 321-324. The combination of the tapered surfaces, in combination with the metallization of the outer surfaces are designed to re-direct RF signal energy from the first path 301 to second path 302, or vice versa. The tapered portions assist in the re-direction of the RF signal by controlling the transition from the air or dielectric material contained in cavity 320 to RF interface portion 330. In an embodiment where cavity 320 is filled with air, the effect is that the tapered portions form an air-plastic transition region within CS 300, where the plastic region is represented by RF interface portion 330. In some embodiments, the tapered surfaces of the outer dimension may have corresponding tapered surfaces of the inner dimensions. For example, surface 311 may correspond to surface 321, surface 312 may correspond to surface 322, surface 313 may correspond to surface 323, etc. In some embodiments, the taper angle of the inner dimension tapered surfaces may be greater than the taper angle of the outer dimension tapered surfaces. For example, the angle between a vertical line parallel to path 301 and tapered surface 321 is $\alpha_1$ and the angle between a vertical line parallel to path 301 and tapered surface 331 is $\beta_1$, where $\alpha_1$ is greater than $\beta_1$. As another example, the angle between a horizontal line parallel to path 302 and tapered surface 324 is $\alpha_2$ and the angle between a horizontal line parallel to path 302 and tapered surface 334 is $\beta_2$, where $\alpha_2$ is greater than $\beta_2$.

The size of the cross-sectional area of RF interfacing region 320 may be selected to strike a balance between misalignment tolerance with a device housing and RF mode control of the RF signal. Misalignment tolerance can refer to physical alignment of RF interfacing region 320 within an interfacing structure such as a housing (e.g., see FIG. 4A). A relatively larger cross-sectional area may result in better alignment, whereas a relatively smaller cross-sectional area may be more susceptible to misalignment. Mode control can be characterized as single-mode or multi-mode. Single-mode is less susceptible to distortion and resonance, and can be more energy efficient than multi-mode. The misalignment tolerance and the mode control work against each other depending on the size of the cross-sectional area of RF interfacing region 320. A larger cross-sectional area can increase the misalignment tolerance, but can push the mode control into multi-mode, whereas a smaller cross-sectional area decreases the misalignment tolerance, but better enables single-mode control. The dielectric constant of RF interfacing region 320 may affect its sizing to achieve the balance of alignment and mode control. The dielectric constant may affect the wavelength of the RF signal. A higher dielectric constant results in a shorter wavelength, thereby enabling use of a smaller cross-sectional area. A lower dielectric constant results in a larger wavelength, which may require use of a larger cross-sectional area.

FIGS. 4A-4C show illustrative perspective, top, and side views, respectively of multiple CSs according to an embodiment. FIG. 4A shows device 400 that includes housing 402, and device 450 that includes housing 452. Device 400 can include CS 410 and 420, and device 450 can include CS 420 and 470. CS 410, 420, 460, and 470 can be similar to CS 300 of FIGS. 3A-3I. CS 410 interfaces with housing 402 via its RF signal interfacing region 412, and CS 420 interfaces with housing 402 via its RF signal interfacing region 422. CS 460 interfaces with housing 452 via its RF signal interfacing region 462, and CS 470 interfaces with housing 452 via its RF signal interfacing region 472. CS 410 is operative to communicate with CS 460 via RF signal interfacing regions 512 and 462 (and any air gap that may exist between housings 402 and 452) and CS 420 is operative to communicate with CS 470 via RF signal interfacing regions 422 and 472 (and any air gap that may exist between housings 402 and 452). Housings 402 and 452 may be constructed from, or include, metal that prevents RF signals from passing through the metalized portions of housings 402 and 452. As such, RF signal passage through housings 402 and 452 is limited to the RF interfacing regions of the CSs.

FIGS. 5A and 5B show illustrative RF signal propagation of FIGS. 4A and 4C, respectively, according to various embodiments. In both FIGS. 5A and 5B, assume that CS 410 is transmitting signals to CS 460, and that no signals are currently being transmitted between CS 420 and CS 470. As shown in both FIGS. 5A and 5B, the RF signal radiation is relatively concentrated in RF interfacing portions 412 and 462 and passes through an air gap existing between housings 402 and 452. A minimal amount of RF radiation is shown radiating within the air gap, thus showing that CS arrangement is able to contain and direct the RF signal energy to enable contactless communications.

FIG. 6 shows an illustrative cross-sectional view of dielectric insert conduit structure (DICS) 600 according to an embodiment. DICS 600 is operative to redirect the RF signal from path 601 to path 602, or vice versa. DICS 600 can include metalized cover 610, dielectric insert 620, CCU 630, and substrate 640. Metalized cover 610 completely covers CCU 630, but has an open face to permit transmission of an RF signal into and out of DICS 600. In one embodiment, metalized cover 610 may be a plastic molded part that is metalized to prevent electromagnetic signals from passing through. The metallization embodiments discussed above can apply to metalized cover 610. In another embodiment, metalized cover may be constructed solely from metal. Although not shown in detail in FIG. 6, metalized cover 610 can include tapered inner and outer surfaces to assist in RF signal redirection.

Dielectric insert 620 is designed to fit inside metalized cover 610 and serve as a waveguide for RF signals being re-directed from path 601 to path 602, or vice versa. Dielectric insert 620 may be designed to occupy as much space within metalized cover 610 as possible to eliminate air gaps. Dielectric insert 620 may be a plastic molded part having a constant or varying dielectric constant. An advantage of DICS 600 over, for example, CS 300 is that use of dielectric insert 620 enables the overall size of DICS 600 to be smaller than CS 300. The shape of dielectric insert 620 is designed to balance modality, misalignment tolerance, and RF signal efficiency. In some embodiments, insert 620 may also interface with a housing to permit RF signals to pass into or out of a device containing DICS 600.

Figure 7A:
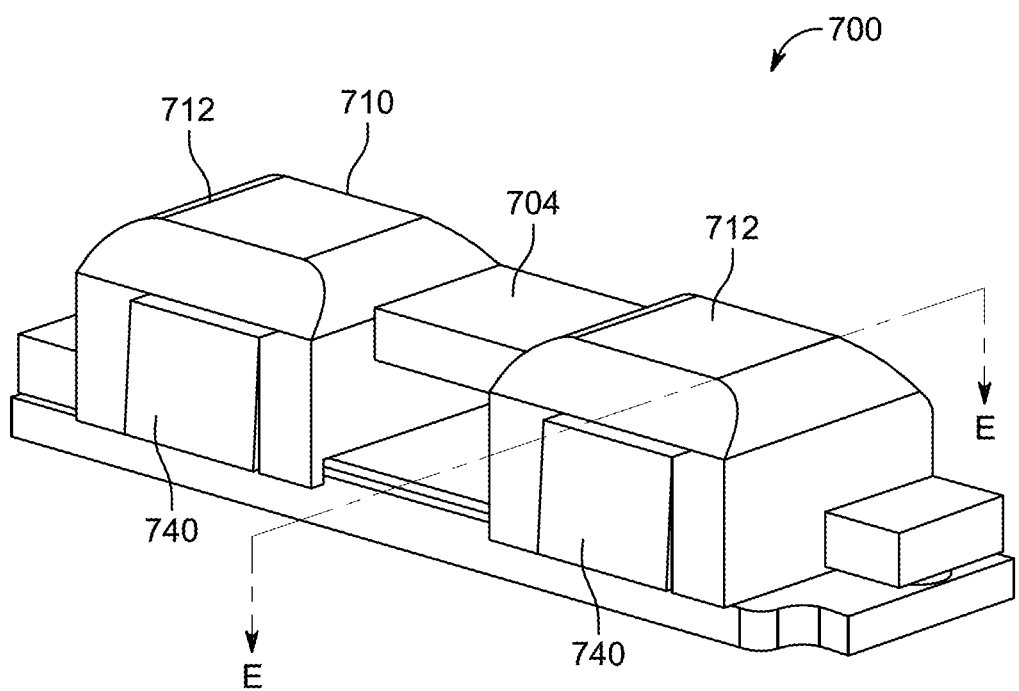
Figure 7B:
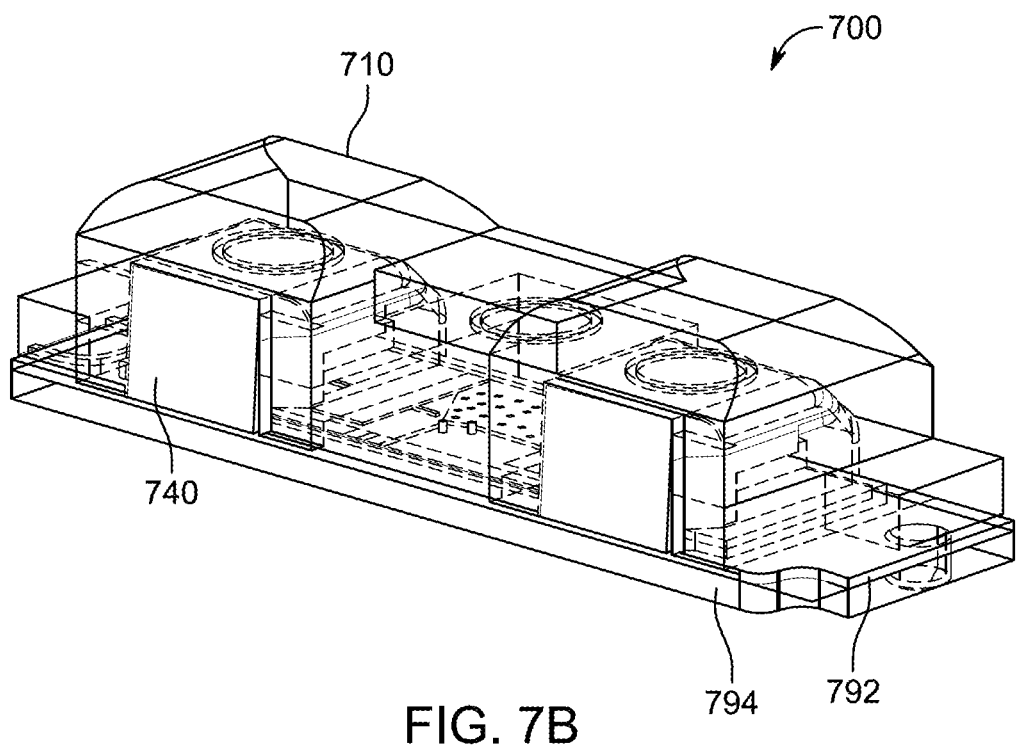
Figure 7C:
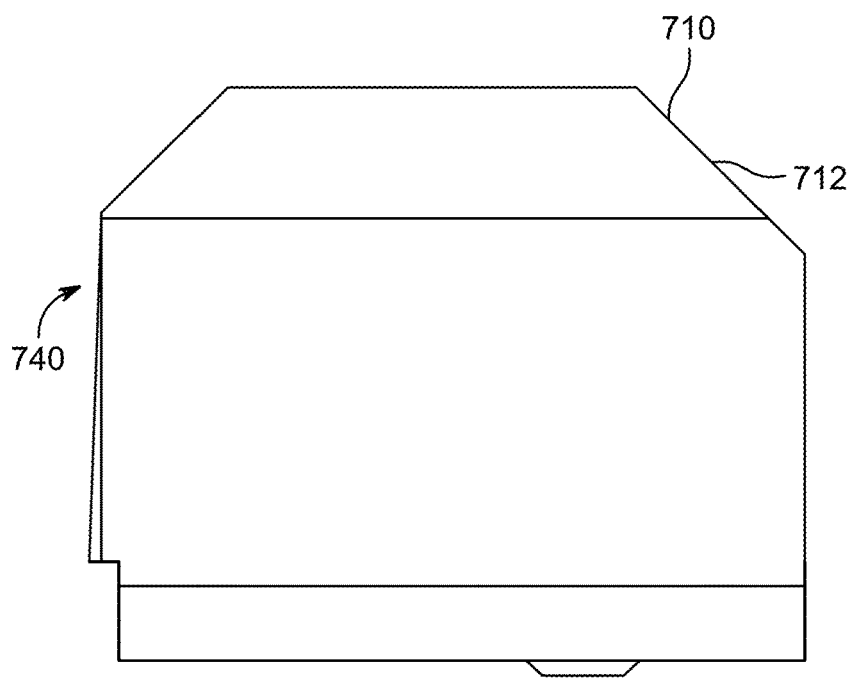
Figure 7D:
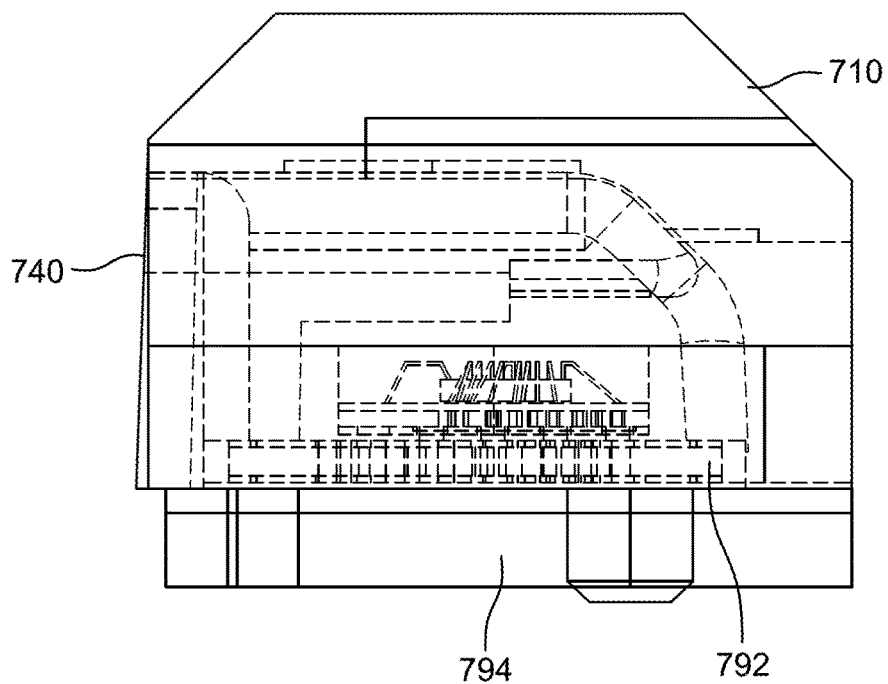
Figure 7E:
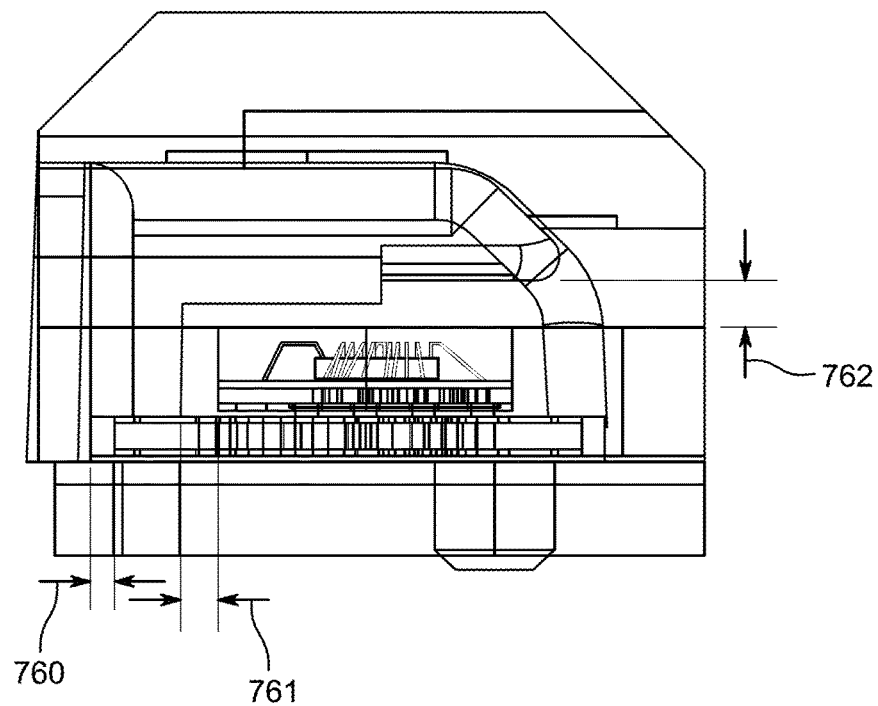
Figure 7F:
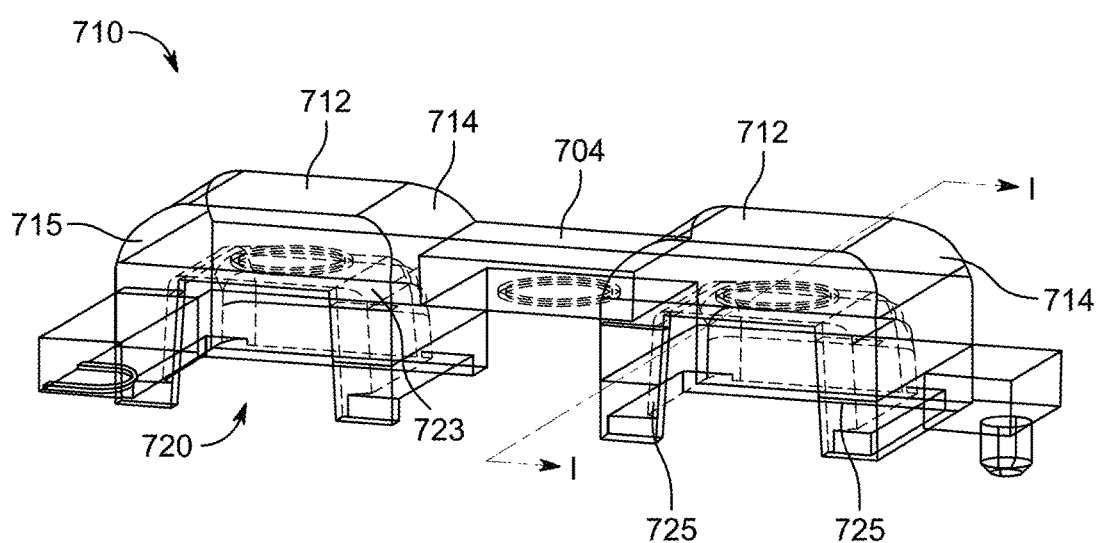
Figure 7G:
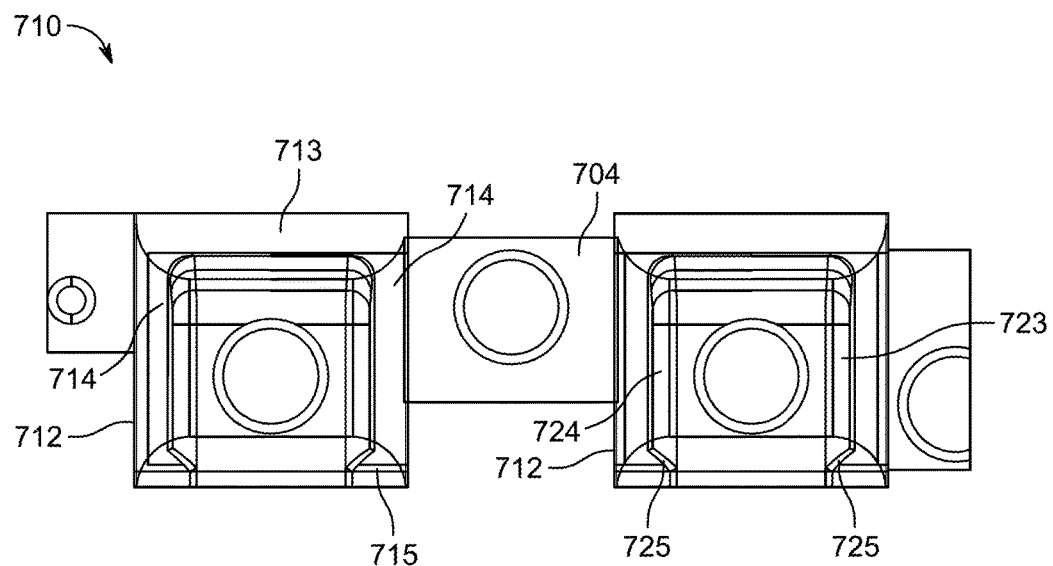
Figure 7H:
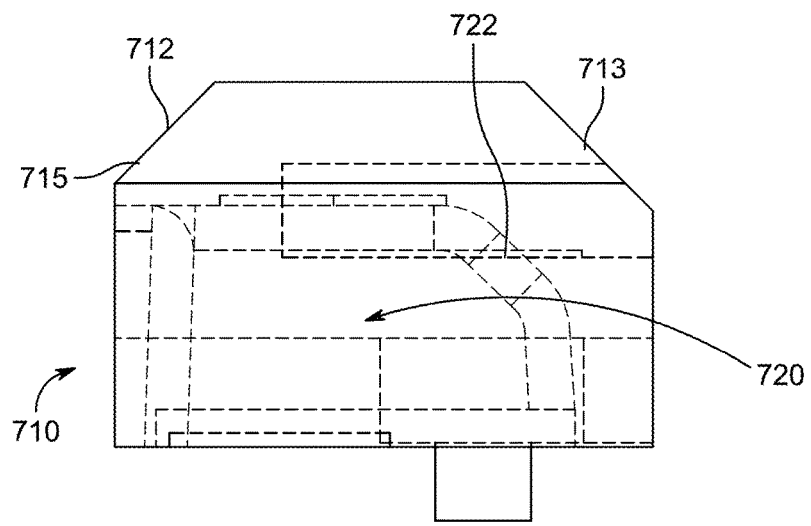
Figure 7I:
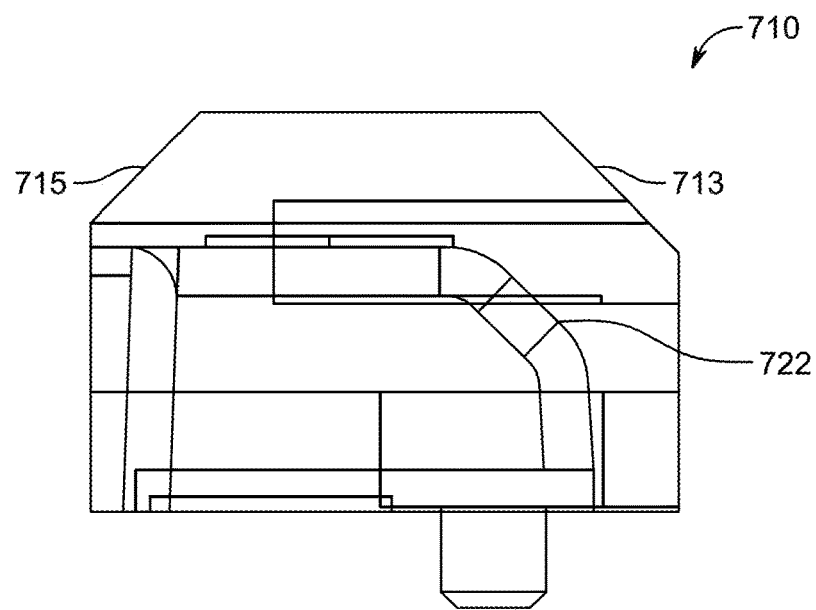
Figure 7J:
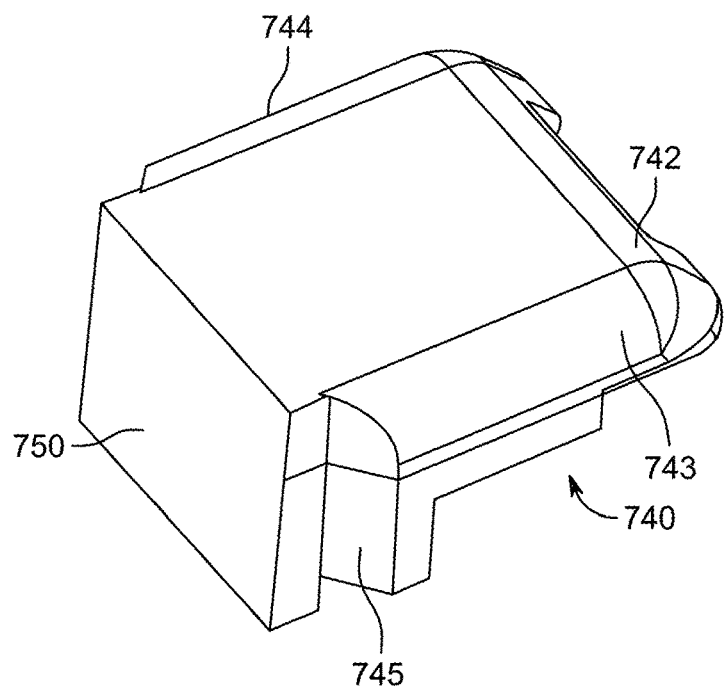
Figure 7K:
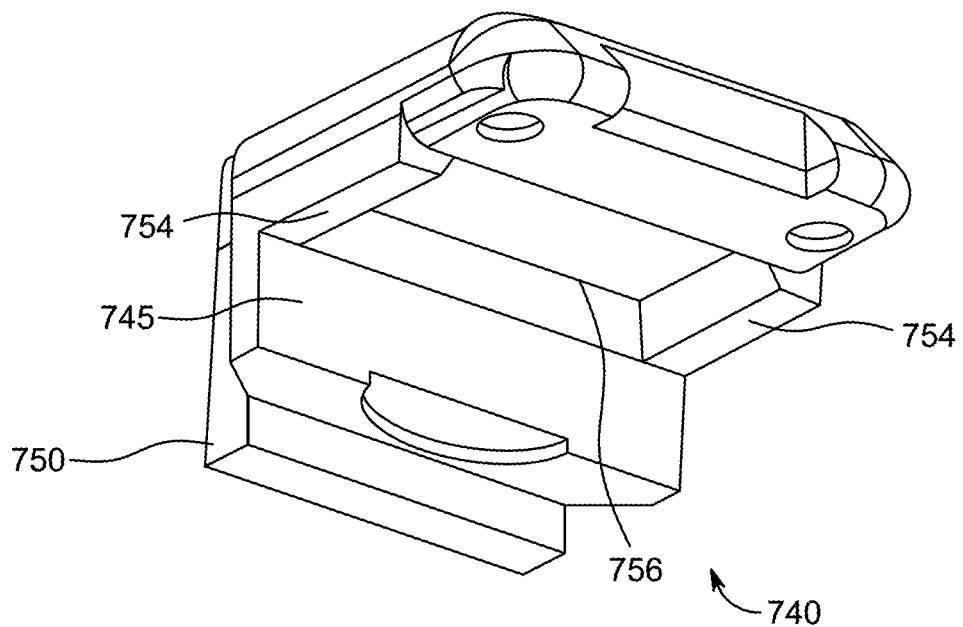

FIGS. 7A-7K show several different views of dielectric insert conduit structure (DICS) 700 according to an embodiment. DICS 700 embodies the principles of DICS 600, but show many more details associated with its metalized cover and dielectric insert. FIG. 7A shows an illustrative perspective view of DICS 700. FIG. 7B shows an illustrative perspective view of DICS 700 with hidden lines. FIG. 7C shows an illustrative side view of DICS 700 and FIG. 7 D shows the same side view with hidden lines. FIG. 7E shows an illustrative cross-sectional view taken along line E-E of FIG. 7A. FIGS. 7F-7H show illustrative perspective, top and side views of metallized cover 710. FIG. 71 shows an illustrative cross-sectional view of metallized cover 710 taken along line H-H of FIG. 7F. FIGS. 7J and 7K different perspective views of dielectric insert 720.

DICS 700 can include metallized cover 710, dielectric inserts 740, CCUs 790, first substrate 792, and second substrate 794. First substrate 792 may be a circuit board on which CCUs 790 are mounted. Second substrate 794 may be another circuit board or structure that supports first substrate 792. Metallized cover 710 can a plastic component that is metallized or it can be a metal component. In one embodiment, the entirety of metallized cover 710 is completely covered with metal, including internal and exterior surfaces. Metallized cover 710 can include one or more dielectric receiving members 712, which are constructed to receive dielectric inserts 740. As shown, two dielectric receiving members 712 that are connected via bridge member 704. Both members 712 may have openings facing the same direction at the same attitude. The attitude may refer to the orientation of the opening with respect to a planar surface of substrate 792. For example, the attitude of the opening would be zero if it is oriented 90 degrees relative to the planar surface of substrate 792. It should be appreciated that the openings may face different directions at the same or different attitude. For example, one opening may be oriented in a first direction (e.g., 0 degrees) and a second opening may be oriented in a second direction (e.g., 90 or 180 degrees). The attitudes of each opening may be the same or different.

Dielectric receiving member 712 has outer dimensions and inner dimensions. The inner dimensions may define cavity 720. The outer dimensions may be shaped to assist in the re-direction of the RF signal. For example, member 712 may include sloped surface 713, and curved surfaces 714 and 715 to promote re-direction. Cavity 720 may also be shaped to assist in the re-direction of the RF signal. In addition, cavity 720 may be further shaped to interface with dielectric insert 740. For example, cavity 720 may include curved surfaces 722, 723, and 724, and tapered surfaces 725. The slope, curved, and tapered surfaces of the external and internal surfaces are all designed to promote re-direction of the RF signal while simultaneously preventing multi-moding.

Both cavity 720 and insert 740 may be dimensioned such that insert 740 occupies as much as cavity 720 as possible. For example, any curves or tapers in cavity 720 are emulated by similarly shaped curves and tapers in insert 740. As a specific example, insert 740 may have curved surfaces 742-744 that are designed to interface with curved surfaces 722-724 of cavity 720, and may include tapered surfaces 745 that are designed to interface with tapered surfaces 725.

Dielectric insert 740 may include face portion 750, wall portions 754, and pocket 756. The size and shape of pocket 756 may be defined by tapered portion 745 and wall portions 754. If desired, pocket 756 could be made bigger by extending wall portion 754. Face portion 750 may be extend outside of cavity 720 and may serve as the entry/exit point for RF signals. When insert 740 is contained within cavity 720, minimum clearance distances 760-762 may exist between insert 740 and either CCU 790 or substrate 792.

FIG. 8 shows an illustrative side view of signal redirecting conduit structure (SRCS) 800 position above CCU 810 and substrate 820, according to an embodiment. CCU 810 is designed to transmit an RF signal along path 801, which runs horizontal with respect to CCU 810 and substrate 820, on which CCU 810 is mounted. Such CCUs may be referred to as side-firing as they direct RF signal energy along a plane parallel to the CCU as opposed to perpendicular to that plane. SRCS 800 is constructed to redirect RF signal energy from path 801 to path 802, or vice versa. SRCS 800 may be an air-filled dielectric conduit structure or a dielectric insert conduit structure, and it should be appreciated that the teachings discussed above apply to SRCS 800.

FIG. 9 shows an illustrative top view of docking system 900 using signal redirecting conduit structures according to an embodiment. Docking system 900 represents an ambidextrous connection mechanism that enables a device to be connected thereto without regard for a specific orientation. That is, the device (not shown) can be connected to docking system 900 in a first orientation or a second orientation and contactlessly communicate data between the device and system 900. System 900 can include docking structure 910 that houses signal redirecting conduit structures 920, 930, 940, and 950. Structures 920 and 930 are designed to transmit and/or receive signals via interface regions 922 and 932, respectively, and structures 940 and 950 are designed to transmit and/or receive signals via interface regions 942 and 952. Interface regions 922 and 932 are facing the opposite direction of interface regions 942 and 952.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. An air-filled dielectric conduit structure for use with a contactless communications unit (CCU) mounted to a substrate, wherein the CCU is operative to selectively transmit and receive RF signals along a first path, the conduit structure comprising:
   a dielectric structure comprising an RF interface region, an external tapered region, an internal tapered region, and an air-filled cavity,
   wherein the CCU is capped by the air-filled cavity, and
   wherein a combination of the air-filled cavity and internal and external tapered regions redirects RF signals transmitted by the CCU along the first path to the RF interface region via a second path and redirects RF signals received via the RF interface region along the second path to the CCU via the first path.

2. The conduit structure of claim 1, further comprising a metallized layer that selectively covers external surfaces of the dielectric structure, but not a face of the RF interface, and wherein the metallized layer prevents RF signal penetration through the covered surfaces of the dielectric structure.

3. The conduit structure of claim 1, wherein a combination of the air-filled cavity, RF interface region, and internal and external tapered regions ensure single mode control of the RF signal.

4. The conduit structure of claim 1, wherein a combination of the air-filled cavity, RF interface region, and internal and external tapered regions strikes a balance between misalignment tolerance of the RF interface region and mode control of the RF signal.

5. The conduit structure of claim 1, wherein the RF interface region and the external tapered regions are part of a single integrated structure that define external dimensions of the dielectric structure, and wherein the internal tapered regions and the air cavity are part of the single integrated structure that define internal dimensions of the dielectric structure.

6. The conduit structure of claim 1, wherein the external tapered regions comprises a first external tapered region and the internal tapered regions comprises a first internal tapered region, wherein the first external and internal tapered regions both mimic a similar shape.

7. The conduit structure of claim 6, wherein the first internal tapered region is characterized as having a larger taper angle than a taper angle of the first external tapered region.

8. A dielectric insert dielectric conduit structure for use with a contactless communications unit (CCU) mounted to a substrate, wherein the CCU is operative to selectively transmit and receive RF signals along a first path, the conduit structure comprising:
a metallized cover constructed to be mounted to the substrate and to cover the CCU, the metallized cover comprising an opening through which the RF signals travel along a second path; and
a dielectric insert constructed to be secured within the metallized cover and to be positioned adjacent to the CCU, the dielectric insert comprising an RF interface positioned adjacent to the opening, wherein a combination of the metallized cover and the dielectric insert redirects RF signals transmitted by the CCU along the first path to the RF interface region via the second path and redirect RF signal received via the RF interface region along the second path to the CCU via the first path, wherein the metallized cover comprises an interior volume, and wherein the dielectric insert occupies a substantial portion of the interior volume.

9. The conduit structure of claim 8, wherein the second path is directed at an angle ranging between 10 and 170 degrees relative to the first path.

10. The conduit structure of claim 8, wherein the second path is directed to an angle ranging between 85 and 95 degrees relative to the first path.

11. The conduit structure of claim 8, wherein the metallized cover is a plastic structure that is substantially covered by a metal.

12. The conduit structure of claim 8, wherein the dielectric insert is a plastic structure that functions as a waveguide.

13. The conduit structure of claim 8, wherein the RF interface region extends beyond a periphery of the metallized cover.

14. A system comprising:
a substrate;
a plurality of contactless communications units (CCUs) mounted to the substrate, wherein the CCUs are operative to selectively transmit and receive RF signals along respective first paths, wherein the RF signals comprise RF radiation; and
a plurality of RF signal redirection structures, each structure mounted over one of the plurality of CCUs and secured to the substrate, wherein each RF signal redirection structure is operative to redirect RF signals from the first path to a second path or redirect RF signals from the second path to the first path for each CCU.

15. The system of claim 14, wherein the plurality of RF signal redirection structures are air-filled redirection conduit structures.

16. The system of claim 14, wherein the plurality of RF signal redirection structures are dielectric insertion conduit structures.

17. The system of claim 14, further comprising a housing, wherein each of the plurality of RF signal redirection structures comprise RF interfacing regions that abut or are integrated within the housing.

18. The system of claim 14, wherein each of the first paths is commonly aligned along a first direction, and wherein each of the second paths is commonly aligned along a second direction.

19. The system of claim 14, wherein the plurality of CCUs comprises first, second, third, and fourth CCUs, wherein the first paths associated with the first and second CCUs are commonly aligned along a first direction, and wherein the first paths associated with the third and fourth CCUs are commonly aligned along a second direction, wherein the first and second directions are opposite of each other, and wherein a second path associated with each of the redirecting structures is aligned with a third direction.

* * * * *

UNITED STATES PATENT AND TRADEMARK OFFICE
CERTIFICATE OF CORRECTION

PATENT NO. : 10,256,520 B2
APPLICATION NO. : 15/411748
DATED : April 9, 2019
INVENTOR(S) : Besel et al.

It is certified that error appears in the above-identified patent and that said Letters Patent is hereby corrected as shown below:

In the Specification

In Column 1, Line 26, delete "crosstalk." and insert -- cross-talk. --, therefor.

In Column 4, Line 52, delete "13" and insert -- 113 --, therefor.

In Column 7, Line 5, delete "cross talk and multi-path cross talk" and insert -- cross-talk and multi-path cross-talk --, therefor.

Signed and Sealed this
Fifth Day of May, 2020

Andrei Iancu
*Director of the United States Patent and Trademark Office*